US007815960B2

(12) United States Patent
Quan et al.

(10) Patent No.: US 7,815,960 B2
(45) Date of Patent: Oct. 19, 2010

(54) GREEN TEA FORMULATIONS

(76) Inventors: Danyi Quan, 4156 S. Megan Cir., Salt Lake City, UT (US) 84107; Wade W. Xiong, 4156 S. Megan Cir., Salt Lake City, UT (US) 84107

( * ) Notice: Subject to any disclaimer, the term of this patent is extended or adjusted under 35 U.S.C. 154(b) by 446 days.

(21) Appl. No.: 11/820,482

(22) Filed: Jun. 18, 2007

(65) Prior Publication Data
US 2007/0292560 A1 Dec. 20, 2007

Related U.S. Application Data

(63) Continuation of application No. 10/877,757, filed on Jun. 24, 2004, now Pat. No. 7,232,585.

(51) Int. Cl.
A23F 3/18 (2006.01)

(52) U.S. Cl. .................. 426/597; 426/435; 426/655; 426/271; 426/425; 426/422; 426/590

(58) Field of Classification Search .............. 426/597, 426/655, 435, 271, 425, 422, 590
See application file for complete search history.

(56) References Cited

U.S. PATENT DOCUMENTS

| | | | |
|---|---|---|---|
| 3,902,273 A | 9/1975 | Freidman | |
| 4,004,038 A | 1/1977 | Wickremasingh | |
| 4,051,264 A | 9/1977 | Sanderson et al. | |
| 4,220,673 A | 9/1980 | Strobel | |
| 4,474,822 A | 10/1984 | Sato et al. | |
| 4,490,402 A | 12/1984 | Lunder et al. | |
| 4,613,672 A | 9/1986 | Hara | |
| 4,668,525 A | 5/1987 | Creswick | |
| 4,935,256 A | 6/1990 | Tsai | |
| 5,043,100 A | 8/1991 | Chang et al. | |
| 5,139,802 A | 8/1992 | Liu et al. | |
| 5,196,214 A | 3/1993 | Lee | |
| 5,258,188 A | 11/1993 | Barmentlo et al. | |
| 5,427,806 A | 6/1995 | Ekanayake et al. | |
| 5,529,796 A | 6/1996 | Gobbo et al. | |
| 5,538,750 A | 7/1996 | Yamaguchi et al. | |
| 5,683,736 A | 11/1997 | Lunder | |
| 5,800,852 A | 9/1998 | Levinson | |
| 5,820,901 A | 10/1998 | Nicolas et al. | |
| 5,827,560 A | 10/1998 | Fu et al. | |
| 5,863,581 A | 1/1999 | Barrett et al. | |
| 5,879,733 A | 3/1999 | Ekanayake et al. | |
| 5,910,308 A * | 6/1999 | D'Jang | 424/729 |
| 5,919,500 A | 7/1999 | Lehmberg et al. | |
| 5,925,389 A | 7/1999 | Lehmberg et al. | |
| 5,952,023 A | 9/1999 | Lehmberg et al. | |
| 5,980,969 A | 11/1999 | Mordini et al. | |
| 5,989,557 A | 11/1999 | Bombardelli et al. | |
| 6,063,428 A | 5/2000 | Ekanayake et al. | |
| 6,096,359 A | 8/2000 | Bombardelli et al. | |
| 6,113,965 A | 9/2000 | Goodsall et al. | |
| 6,268,009 B1 * | 7/2001 | Ekanayake et al. | 426/597 |
| 6,299,925 B1 * | 10/2001 | Xiong et al. | 426/597 |
| 6,387,428 B1 | 5/2002 | Kinugasa et al. | |
| 6,482,450 B1 | 11/2002 | Goodsall et al. | |
| 2005/0008712 A1 * | 1/2005 | Bagchi et al. | 424/729 |

FOREIGN PATENT DOCUMENTS

| | | |
|---|---|---|
| EP | 1 452 095 | 11/2002 |
| JP | 3-87142 | 4/1991 |
| JP | 3-108444 | 5/1991 |
| JP | 04-293450 | 10/1992 |
| JP | 9-121770 | 5/1997 |
| JP | 10304822 | * 11/1998 |
| JP | 2003-225054 | 12/2003 |
| WO | WO 96/04802 | 2/1996 |

OTHER PUBLICATIONS

Zhen, Yong-su. Tea-Bioactivity and Therapeutic Potential. 2002. pp. 73 and 74.*

* cited by examiner

Primary Examiner—Anthony Weier

(57) ABSTRACT

Green tea formulations and methods for the preparation thereof are shown and described. Generally speaking, the method of preparation includes the mixing of fresh tea leaves in an amount of cold water, followed by pulverization of the leaves to release their intracellular material from the cells of the green tea leaves into the water and form an aqueous extract component. The remaining cellular material forms a leaf residue component which is removed from the mixture. Once the leaf residue is removed, the aqueous extract component is collected and may be dried or further processed to produce a final tea extract that has good natural color, robust natural flavor, and pleasant organoleptic properties, which also is high in polyphenol content, and may be used for various purposes such as the creation of a green tea beverage.

41 Claims, No Drawings

GREEN TEA FORMULATIONS

PRIORITY DATA

This application is a continuation of U.S. patent application Ser. No. 10/877,757, filed on Jun. 24, 2004 now U.S. Pat. No. 7,232,585, the entirety of which is incorporated herein by reference.

FIELD OF THE INVENTION

The present invention relates to formulations derived from the green tea plant *camellia sinensis*, and to methods for the preparation thereof. Accordingly, the present invention involves the fields of botany, chemistry, and nutraceuticals.

BACKGROUND OF THE INVENTION

Leaves of the plant *camellia sinensis* have long been used in order to make beverages known as "tea". A variety of specific teas have been produced from this plant, such as white tea, green tea, oolong tea, and black tea, each depending on the type and degree of post harvest processing to which the leaves are subjected. For example, the preparation of leaves for white and green teas include only the steaming and drying of leaf and bud. By contrast, leaves used to make oolong and black teas are typically withered, steamed and then fermented or oxidized to a selected degree. Of these, green tea and white tea are the least processed, black tea leaves are the most processed, and oolong tea leaves receive an intermediate degree of processing. Once the tea leaves have been prepared, the basic process of making a tea beverage typically entails brewing, steeping, or infusing the prepared leaves in hot water.

While tea has been traditionally prepared and consumed as a hot aqueous infusion or brew for several centuries, modern times have produced a number of variations on this known standard. Iced tea prepared and served cold, instant tea produced from a fully soluble powder, and bottled tea prepared and shipped in a liquid state have all found a consumer demand. Moreover, a number of additional herbal ingredients have now been included with the tea in order to provide specifically desired positive health benefits.

Of course, such preparations typically require a complicated production procedure and often require the use of various chemicals and additives. For example, U.S. Pat. No. 6,482,450 to Goodsall et al., which is incorporated herein by reference, discloses methods for producing a black leaf tea that infuses in either hot or cold water. The basic process described entails treating macerated green tea leaves with tannase, and then fermenting in the presence of a sufficient amount hydrogen peroxide to activate endogenous peroxidases and oxidize gallic acid and other tannase-liberated elements. The mixture is then dried.

In addition to traditional and cultural reasons for consuming tea, a renewed interest has been fueled by the discovery of strong antioxidant properties provided by tea prepared from *camellia sinensis* leaves. Such an antioxidant effect has been primarily attributed to the polyphenol content of the tea leaves.

The active constituents of green tea are believed to be the polyphenols, commonly known as tea catechins. The major tea catechins are epigallocatechin gallate (EGCG), epigallocatechin (EGC), epicatechin gallate (ECG), and epicatechin (EC). Of these, EGCG is the most abundant and possesses the most potent antioxidative activity. Various polyphenols are thought to provide an antioxidant effect that may treat or prevent various forms of cancer, and may also treat or prevent other chronic diseases, such as atherosclerosis. See, Zhao B. et al., *Cell Biophys.* 14,175 (1989); and Huang M. T. et al., *Carcinogenesis* 13, 947 (1992); Nakachi K, Eguchi H, Imai K., Ageing Res Rev. January 2003, 2(1): 1-10; Katiyar S K., Curr Drug Targets Immune Endocr Metabol Disord. September 2003; 3(3): 234-42; Adhami V M, Ahmad N, Mukhtar H., J. Nutr. July 2003; 133(7 Suppl): 2417S-2424S; Maron D J, et al. Arch Intern Med. Jun. 23, 2003; 163(12): 1448-53; Raederstorff D G, Schlachter M F, Elste V, Weber P., J. Nutr Biochem. June 2003; 14(6):326-332; Roy M, Chakrabarty S, Sinha D, Bhattacharya R K, Siddiqi M, Mutat Res. February 2003, 523-524:33-41; and Pan T, Jankovic J, Le W., Drugs Aging. 2003; 20(10): 711-21. Therefore, a number of processes for the preparation of tea extracts having improved or enhanced polyphenol potency have been sought.

Most methods for producing tea or green tea extracts with enhanced polyphenol potency require elevated temperatures during the extraction process and/or the use of specialized chemicals or organic solvents. For example, U.S. Pat. No. 4,613,672 to Hara, which is incorporated herein by reference, discloses processes for the production of tea catechins. Specific catechins, such as epicatechin, epigallocatechin, epicatechin gallate, and epigallocatechin gallate may be produced by extracting tea leaves with hot water or an aqueous solution of methanol, ethanol, or acetone, washing the extract containing solution with chloroform, transferring the washed solution into an organic solvent, removing the solution and then passing it through a reversed phase column in the presence of an eluting solution. Additionally, U.S. Pat. No. 5,989,557, to Bombardelli et al. which is incorporated herein by reference, discloses an elaborate multi-step method for preparation of novel polyphenol fractions of *camellia sinensis* which requires a number of organic solvents and several phase separations.

While such methods may be effective for their respective purposes, they each require the use of one or more organic solvents or chemical substances that are not generally fit for human consumption in an appreciable amount. Further, such extraction processes may require heating or other processing conditions and equipment that can be of significant expense and can adversely impact the color, flavor, and organoleptic properties of the resulting tea product.

As a result, methods of preparing *camellia sinensis* extracts that have good natural color, robust natural flavor, and pleasant organoleptic properties, which also is high in polyphenol content, and does not require heating or organic solvents, or chemicals, and products made therefrom having such properties continue to be sought.

SUMMARY OF THE INVENTION

Accordingly, the present invention provides a method of preparing a green tea extract which results in an extract composition having at least some, if not all, of the following characteristics: a) a natural green color provided by a green tea chlorophyll content of from about 0.1% w/w to about 5.0% w/w; b) a total polyphenol content of from about 15% w/w to about 95% w/w; c) a total free amino acid content of from about 0.1% w/w to about 15% w/w; and d) solubility in both hot and cold water. In some aspects, the green tea chlorophyll content may be from about 0.5% w/w to about 4.0% w/w. In some aspects, the green tea polyphenols content may be from about 20% w/w to about 90% w/w. In other aspects, the green tea EGCG content may be from 1% w/w to 85% w/w. In other aspects, the amino acid content may be from about 0.5% w/w to about 10% w/w. In yet further aspects, the amino acids may include at least one member selected from the group consisting essentially of: theanine, glutamic acid, arginine, aspartic acid, glutamine, serine, threonine, alanine, asparagines, lysine, phenylalanine, valine, and mixtures thereof. In yet further aspects, the theanine content may be from about 0.1% w/w to 10% w/w. Tea products made using such an extract have been found to be optically pleasing and have a well received natural green tea taste and organoleptic properties. Additionally, tea products made from the extract provide a significant dose of polyphenols, as well as other positive health benefit imparting agents, such as amino acids, L-theanine, tannins, caffeine, and various minerals, vitamins, proteins, and soluble fibers.

In one aspect, the method of the present invention may include the steps of: a) providing a quantity of fresh green tea leaves; b) reducing the leaves to leaf fragments; c) combining the quantity of crushed leaves with an amount of cold water having a temperature of about 25° C. or less, that is sufficient to provide a mixture of leaves and water having a ratio of from about 1:0.01 to about 1:40 (w/w); d) pulverizing the leaves in the mixture of leaves and water and maintaining said mixture for an amount of time sufficient to allow release of intracellular material from the tea leaf cells into the water to create an aqueous extract component, and a leaf residue component; and e) removing the leaf residue component from the aqueous extract component. It should be noted that in some aspects, a temperature condition of about 50° C. or less may be controlled throughout the extraction process.

Additional steps may be taken before or after the extraction process in order to inactivate the enzyme existing in the fresh green tea leaves. The inactivation process may be conducted on either the fresh green tea leaves or the prepared green tea extracts by using steam, microwave, or instantaneous heat.

Additional steps may be taken in the process in order to provide the extract in a desired physical form, or with a desired chemical content. For example, in one aspect, the method may further comprise drying the aqueous extract to a solid or semi-solid state. In some aspects, the extract may be dried into a powder form. One or more excipients, such as binders and stabilizers may be added to the extract. Additionally, one or more positive health benefit imparting agents may be added to the extract to provide additional desired therapeutic effects.

It is to be understood that only fresh green tea leaves and cold water are to be used, and that no heat is to be added during the entire extraction process of the present invention and a that temperature of about 50° C. or less is maintained throughout the extraction process. In this way, the good natural color, fresh flavor, and organoleptic properties of the green tea plant are preserved and provided to a product made with the extract. Additionally, polyphenol concentration remains high, and the resultant extract is soluble in both hot and cold water.

In some aspects, the fresh green tea leaves provided and used have been harvested from the green tea plant *camellia sinensis*, which are non-fermented or very slightly fermented. In some aspects, the leaves may be used for less than 48 hours after harvested.

Once provided, the quantity of green tea leaves is mixed with an amount of the cold water. The amount of the cold water used to form the leaf and water mixture may be an amount that suitably provides a leaf to water ratio of from about 1:0.01 to about 1:40 (w/w). In one aspect, the ratio may be about 1:1 to 1:30 (w/w). In another aspect, the ratio may be about 1:5-1:20 (w/w). Such quantities have been known to yield a green tea extract at a ratio of from about 0.01:1 to about 40:1 with the quantity of green tea leaves provided. In one aspect, the ratio of green tea leaves provided to tea extract obtained by the present method may be about 1:1 to 30:1. In a detailed aspect, the ratio of green tea leaves provided to tea extract obtained by the present method may be about 5:1 to 20:1.

In accordance with one aspect of the invention, the green tea leaves of the leaf and water mixture are pulverized in order to release the intracellular material containing the beneficial or therapeutic substances from the tea leaf cells, and form an aqueous component containing such materials, and a leaf residue component. Such a step typically results in the rupture of at least about 75% of all green tea leaf cells. In another aspect, the amount of cells ruptured may be from about 80% to about 99% of all green tea leaf cells are ruptured. In a further aspect, at least about 99% of all green tea leaf cells are ruptured. Rupturing of the leave's cellular material is important in order to release the intracellular elements into the water component of the extract.

After the tea leaves of the leave and water mixtures have been adequately pulverized, the remaining leaf cell residue is removed from the aqueous mixture. Those of ordinary skill in the art will recognize a number of suitable mechanism for effecting such removal, including centrifugation, super centrifugation, filtration, ultra filtration, etc.

Optionally, the method of the present invention may include the step of sterilizing, either the plant material once received, or the final extract form, or an intermediate extract form. Those of ordinary skill in the art will therefore recognize a number of suitable sterilization procedures suitable for use given the temperature constraints of the process. However, in one aspect, the sterilization may be accomplished with steam or radiation.

The green tea extracts from this invention can be applied to food, functional food, beverage, functional beverage, tea and coffee beverage, dairy products, dietary supplements, nutraceuticals, pharmaceuticals, cosmetics, skin care, oral care, personal care and dermatological products.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

In describing and claiming the present invention, the following terminology will be used in accordance with the definitions set forth below.

The singular forms "a," "an," and, "the" include plural referents unless the context clearly dictates otherwise. Thus, for example, reference to "a solvent" includes reference to one or more of such solvents, and reference to "the excipient" includes reference to one or more of such excipients.

As used herein, "formulation" and "composition" may be used interchangeably and refer to a combination of elements that is presented together for a given purpose. Such terms are well known to those of ordinary skill in the art.

The phrase "green tea" has been traditionally used to refer to a hot beverage that is created by infusing, steeping, or brewing leaves from the plant *camellia sinensis*. However, in more recent times, the phrase "green tea" has also been used to refer to the *camellia sinensis* plant itself, for example "green tea plant", and has further been used to refer to products derived from such plant. Accordingly, as used herein, "green tea" refers to an item or product that contains one or more elements having the *camellia sinensis* plant as the source thereof. For example "green tea extracts", "green tea beverages", "green tea food items," "green tea tablet", and "green tea powder", would all be items or products that include one or more elements derived from the *camellia sinensis* plant. Therefore, all such phrases would fall within the definition of "green tea" as used herein.

As used herein with respect to a temperature for the processing conditions of the preparation of a green tea extract, or with respect to a component or element used in the preparation of a green tea extract, "cold" refers to a temperature that is less than temperatures typically used in traditional green tea extraction processes, such as steeping, infusing, brewing, etc. However, in some aspects, "cold" may refer to a temperature of about 50° C. or less. In another aspect, the temperature may be about 25° C. or less. In a further aspect, the temperature may be from about 0° C. to about 45° C.

As used herein, "leaves" refers to not only the leaves of a plant, but also to other parts that may be harvested and used for the same purpose as the leaves. For example, with respect to a *camellia sinensis* plant the leaves may include not only the leaves, but also the buds. Additional portions of various plants may equally provide a desired characteristic as that provided by a leaf, such as bark, roots, stem, cones, fruit, thistle, etc. Those of ordinary skill in the art will be able to suitably identify specific portions of a given plant that could be used to provide the same aspects for which the leaves are sought, such as being a source for a certain chemical substance.

As used herein with respect to green tea leaves, "fresh" refers to leaves that are harvested from a green tea plant *camellia sinensis*, which are non-fermented or very lightly fermented when they are used in the present invention.

As used herein, "pulverize" refers to a process of physically acting on plant tissue in a manner that ruptures plant cells and allows for the release of intracellular material therefrom.

As used herein, "polyphenols" refers to catechins from a *camellia sinensis* plant. The green tea polyphenols are composed of six kinds of catechins and its derivatives. EGCG is the largest in content and next to this are EGC, EGC and EC in the decreasing order in amount. Gallocatechin (GC) and catechins (C) are usually minor components.

As used herein, "excipients" refers to one or more agents that can be combined with a green tea extract in order to provide specifically desired physical or chemical properties, such as improved stability, flow, and lubrication, etc. Various materials are known as excipients in both the pharmaceutical and food industries.

As used herein, "carrier," "inert carrier," and "pharmaceutically acceptable carrier" may be used interchangeably and refer to an inert carrier which may be combined with a green tea extract in order to provide a desired formulation form. Those of ordinary skill in the art will recognize a number of carriers that are well known for making specific dosage forms, such as liquids, tablets, capsules, powders, granules, food substances, etc.

As used herein, "herbal extract" refers to an extract from a plant, tree, bush, shrub, or other botanical organism other than from *camellia sinensis*, which may be used to impart a positive health benefit when administered to a subject. Similar respective meanings apply to the terms "fruit extract" and "vegetable extract" in that such terms refer to positive health benefit imparting extracts obtained from various commonly known botanical organisms classified as "fruits" or "vegetables" and does not include extracts obtained from the *camellia sinensis* plant.

As used herein, "an effective amount" refers to an amount of the specified constituent that is effective in attaining the purpose for which the constituent is provided. Therefore, an effective amount of a carrier would be an amount suitable for accepting a green tea extract and then providing a specified formulation, such as a tablet, granule, powder, etc.

Concentrations, amounts, solubilities, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a concentration range of 1 to 5 should be interpreted to include not only the explicitly recited limits of 1 and 5, but also to include individual values such as 2, 7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10".

The Invention

The present invention provides green tea extract formulations containing certain desirable properties and methods for the making thereof. The green tea formulations are generally prepared in a manner that preserves and enhances the natural color, odor, taste, and other organoleptic properties of fresh green tea. Additionally, the formulations are typically prepared so as to contain mostly, if not all, natural ingredients, and to have a high polyphenol content. Further, the formulations are typically soluble in both hot and cold water.

In one aspect, the present invention provides a green tea extract having at least one or more, if not all, of the following characteristics: a) a natural green color provided by a green tea chlorophyll content of from about 0.1% w/w to about 5.0% w/w; b) a total polyphenol content of from about 15% w/w to about 95% w/w; c) a total free amino acid content of from about 0.1% w/w to about 15% w/w; and d) solubility in both hot and cold water.

The natural green color is provided by the unoxidized green tea chlorophyll content of the extract. As is known in the art, the preparation of oolong and black teas requires the fermentation of green tea leaves, which oxidizes the chlorophyll in the leaves and causes the color of beverages and extracts prepared therefrom to be brown, tan, or red. By contrast, the green tea extract of the present invention retains active chlorophyll content of from about 0.05% w/w to about 8% w/w that imparts a green to green-yellow color. In one aspect, the amount of active chlorophyll may be from about 0.1% w/w to about 5.0% w/w of the extract. In another aspect, the active chlorophyll content may be from about 0.5% w/w to about 4% w/w of the extract. In a further aspect, the chlorophyll content may be from about 0.5% w/w to about 3.0% w/w.

As discussed above, polyphenols have recently been discovered to have a number of desirable positive health benefits, particularly in preventing or treating various chronic conditions, such as cancer and atherosclerosis. Accordingly, it has been recognized as desirable to provide a green tea extract with high polyphenol content. Many processes of extraction are known which target only the polyphenols for removal from a green tea plant by using organic solvents and chemicals. While the present extraction method is capable of obtaining an extract with high polyphenol content, its purpose is not to target and extract polyphenols only, but rather to provide an extract that includes many beneficial nutrients naturally existing in green tea leaves. In accordance with the present invention, such an extract can be obtained using a solvent-free cold water extraction process, and can in some aspects, be used to prepare a green tea product that has the visual, taste, and organoleptic characteristics recited herein.

Accordingly, in one aspect of the present invention, a green tea extract having a polyphenol content of from about 15% w/w to about 95% w/w may be obtained using the methods recited herein. In another aspect, the polyphenol content may be from about 20% w/w to about 90% w/w. In yet another aspect, the polyphenol content may be from about 25% w/w to about 85% w/w. Alternatively, the polyphenol content of the extract may be recited by total polyphenol content provided by an extract when used to prepare a single serving of a food or beverage item, for example, an 8 oz. tea beverage. In one aspect, the amount may be sufficient to provide a single serving of a food or beverage item with at least about 100 mg of polyphenols. In another aspect, the amount of polyphenols may be at least about 300 mg. In yet another aspect, the amount of polyphenols may be at least about 600 mg.

Of green tea polyphenols, EGCG has the most potent antioxidative activity. Accordingly, in one aspect of the present invention, a green tea extract having an EGCG content of from about 1% w/w to about 85% w/w may be obtained using the methods recited herein. In another aspect, the EGCG content may be from about 3% w/w to about 80% w/w. In yet another aspect, the EGCG content may be from about 5% w/w to about 75% w/w. Alternatively, the EGCG content of the extract may be recited by EGCG content provided by an extract when used to prepare a single serving of a food or beverage item, for example, an 8 oz. tea beverage. In one aspect, the amount may be sufficient to provide a single serving of a food or beverage item with at least about 50 mg of EGCG. In another aspect, the amount of EGCG may be at least about 150 mg. In yet another aspect, the amount of EGCG may be at least about 300 mg.

It has been discovered that one important element in obtaining a green tea extract that imparts a natural green tea taste is the amino acid content. A number of amino acids are known to be present in green tea, including without limitation theanine, glutamic acid, arginine, aspartic acid, glutamine, serine, threonine, alanine, asparagines, lysine, phenylalanine, valine, and mixtures thereof. Accordingly, in one aspect, the green tea extract of the present invention may be prepared so as to have a sufficient amount of such amino acids as to impart a natural green tea taste to a beverage or food item to which it is incorporated. In another aspect, the amount of amino acids may be from about 0.1% w/w to about 15% w/w of the extract. In yet another aspect, the amount of amino acids may be from about 0.5% to about 10% of the extract. In yet further aspects, the theanine content may be from about 0.1% w/w to 10% w/w. In another aspect, the amount of theanine may be from about 0.5% w/w to about 8% w/w of the extract. In yet another aspect, the amount of theanine may be from about 1% to about 6% of the extract.

It has additionally been found that by using cold water and temperature conditions during the preparation of a green tea extract may yield an extract that is soluble in both hot and cold water. As such, in one aspect of the present invention, the green tea extract may be soluble in both cold and hot water, and therefore may be used to create a variety of green tea products and other beverages, as well as be convenient for use in a number of dietary supplement and food items.

The method of the present invention is one that allows the production of a green tea extract formulation having one or more of the characteristics as recited herein. Generally, the first step is to harvest tea leaves from a green tea plant and to begin the extraction process using the leaves, which are non-fermented or very slightly fermented. It has been found that by using the fresh tea leaves of this type, that many of the desired characteristics, such as natural green tea taste, color, and polyphenol content are substantially improved.

Once the leaves have been harvested, it may be desirable to reduce the leaves in size, for example leaf fragments, rather than adding to the water as whole leaves. Those of ordinary skill in the art will recognize a variety of mechanisms for reducing the leaves to leaf fragments or bits, such as by chopping, cutting, crushing, tearing, slicing, etc., any of which may be suitably used. While the temperature of the cold water may vary, in some aspects, it may be less than about 25° C. In another aspect, the water temperature may be from about 0° C. to about 20° C. In yet another aspect, the water temperature may be from about 0° C. to about 15° C. In a further aspect, the water temperature may be from about 0° C. to about 10° C. In an additional aspect, the temperature may be less than about 25° C. Additionally, if the amount of water with which the quantity of leaves is mixed may also vary. However, in one aspect, the quantity of leaves may be mixed with an amount of water, which is sufficient to provide a ratio of from about 1:0.01 to about 1:40 (w/w). In another aspect, the ratio may be from about 1:1 to about 1:30. In yet another aspect, the ratio may be about 1:5 to about 1:20.

Once the appropriate mixture ratio of leaves to water is obtained, the leaves of the mixture are then pulverized, in order to ruptured the cells of the tea leaves, and the mixture is maintained for an amount of time sufficient to release intracellular material from the leaves into the water and create an aqueous extract component and a leaf residue component. It should be understood that any method of pulverizing which physically ruptures the tea leaf cells, such as homogenizing, milling, grinding, chopping, blending, cutting, tearing, etc., may be used. A number of specific devices that may be suitably used to pulverized the tea leaves in the leaf and water mixture will be recognized by those of ordinary skill in the art, such as homogenizer, colloidal mills, stone mills, ball mills or tangential fluid energy mills. In accordance with the present method, the leaves in the leaf and water mixture may be subjected to various degrees of pulverization. However, in one aspect, at least about 75% of all green tea leaf cells may be ruptured. In another aspect, at least about 80% to about 99% of all green tea leaf cells may be ruptured. In a further aspect, at least about 99% of all green tea leaf cells may be ruptured.

The specific degree of pulverization, as well as other factors such as the exact type of green tea plant used, the time of year at which the leaves were harvested, and the amount of time that the leaf and water mixture is maintained following pulverization, will determine the efficiency of the overall extract process. However, in one aspect, the process may be conducted so that the quantity of green tea leaves used provides an amount of green tea extract in a ratio of from about 0.01:1 to about 40:1 (w/w). In another aspect, the ratio of leaves provided to extract obtained may be from about 1:1 to about 30:1. In yet another aspect, the ratio may be about 5:1 to about 20:1.

Once the aqueous extract component has received a desired amount of intracellular material, the leaf residue component may be removed or separated from the aqueous extract component, and the aqueous extract component may then be collected. Those of ordinary skill in the art will recognize a number of ways in which the leaf residue component may be physically separated from the aqueous extract component, such as by centrifugation, super centrifugation, filtration, ultra filtration, etc., which do not require elevated temperatures, or any chemicals, such as solvents, etc. It is important to note, that the resultant aqueous extract, need not be visually clear, but rather may be cloudy, or somewhat opaque in nature, and that such visual characteristics may in some instances be necessary in order to provide one or more of the desirable formulation characteristics recited herein, such as a high polyphenol, or polysaccharide content. Additionally, it should be noted that in some aspects, tea beverages created using the extract formulations of the present invention may also display a somewhat cloudy or opaque, visual characteristic. Alternatively, in some aspects, the green tea extracts of the present invention may be further processed in a manner sufficient to provide a clear tea beverage.

It is to be noted that the fresh green tea leaves and cold water have been used and no heat is added during the entire extraction process of the present invention, and a temperature of about 50° C. or less has been maintained throughout the extraction process.

After the aqueous extract component has been collected it may be used in the formation of various products, or it may, optionally be further processed in order to create an extract formulation having desired characteristics. For example, in one aspect, after collection, the aqueous extract may be dried into a solid or a semi-solid state, such as a powdered form. Any of the various well known drying techniques, such as freeze-drying, or spray drying may be used. Additionally, various excipients may be added to the extract, either before or after drying, which are required in order to provide a formulation with desired properties or forms, such as a powder, granule, tablet, capsule, etc. Those of ordinary skill in the art will recognize a number of excipients that may be suitably added, such as fillers, binders, sweeteners, flavors and other ingredients. Nearly any excipients that are known for use in the preparation of oral dosage pharmaceutical products, or natural supplement products, can be used. Examples of such excipients include without limitation, carbomer, carboxymethylcellulose sodium, cellulose, dextrin, dextrose, ethylcellulose, fructose, gelatin, guar gum, hydroxyethyl cellulose, hydroxypropyl cellulose, hydroxypropyl methylcellulose, glucose, maltodextrin, mannitol, methylcellulose, microcrystalline cellulose, polymethacrylates, povidone, sorbitol, starches, sucrose, sugar, sucralose, stevia, and flavor agents.

The additional process may be taken before or after the extraction process in order to inactivate the enzyme existing in the green tea leaves. However, the inactivation process may be conducted on the fresh green tea leaves by steam, microwave or instantaneous heat, or may be conducted on the prepared green tea extract instead of the fresh green tea leaves.

A number of agents may be included in the extraction process and the formulation of the present invention in order to improve the stability thereof by decreasing degradation of polyphenols, chlorophyll, or other beneficial ingredients, provided by the green tea plant, such as L-theanine, tannins, vitamins, amino acids, minerals, proteins, and soluble fiber. However, in one aspect, the stabilizer may be an antioxidant. Examples of such agents which may be used include without limitation, vitamin C, or its derivatives, vitamin E or its derivatives, grape seed and its extract, wine and fruit polyphenols, beta-carotene, co-enzyme Q-10, alpha lipoic acid, N-acetyl cysteine, ascorbyl palmitate, butylhydroxinon, butylated hydroxyanisole (BHA), butylated hydroxytoluene (BHT), citric acid, calcium lactate, dodecyl gallate, erythorbic acid, fumaric acid, gallic acid, lactic acid, malic acid, magnesium lactate, octyl gallate, phosphoric acid, potassium citrate, potassium lactate, potassium tartrate, sodium ascorbate, sodium citrate, sodium erythobate, sodium lactate, sodium metabisulfite, sodium phosphate, sodium tartrate. In a detailed aspect, the antioxidant may be vitamin C or a vitamin C derivative, vitamin E or a vitamin E derivative, citric acid or its derivative, gallic acid or its derivative, and malic acid.

In addition to the aforementioned excipients, in one aspect, one or more positive health benefit imparting agents may be combined with the green tea extract in order to produce a formulation with specifically desired therapeutic properties. A wide variety of positive health benefit imparting agents may be included as desired, such as vitamins, minerals, amino acids, proteins, and other herbal, fruit, and/or vegetable extract agents. For example, vitamins either water soluble or oil soluble may be added. Water soluble vitamins specifically contemplated include without limitation, vitamin $B_1$, $B_2$, $B_3$, $B_5$, $B_6$, $B_{12}$, $B_{13}$, $B_{15}$, $B_{17}$, biotin, choline, folic acid, inositol, para-aminobenzoic acid (PABA), vitamin C, and vitamin P. Additionally, oil soluble vitamins include, but are not limited to: vitamin A, vitamin D, vitamin E, and vitamin K.

Examples of supplemental amino acids that can be added include without limitation: alanine, arginine, carnitine, gamma-aminobutyric acid (GABA), glutamine, glycine, histidine, lysine, methionine, N-acetyl cysteine, ornithine, phenylalanine, taurine, tyrosine, and valine.

Examples of antioxidants that can be added include without limitation: vitamin C or its derivatives, vitamin E or its derivatives, grape seed or its extract, wine polyphenols or wine extract, fruit polyphenols, beta-carotene, noni extract and co-enzyme Q-10, and mixture thereof.

Examples of herbal extract agents that may be added include without limitation, Ginseng, Ginko Biloba, Dong Qui, Hawthorn Berry, St. John's Wort, Saw Palmetto, Kava Kava, Rose Hips, Echinacea, Licorice Root, Grape Seed, Chammomile, Sea Buckthorn, Aloe Vera, Cinnamon Bark, Cordyceps, Ho Shou Wu, Dandelion, Gynostemma, Mushroom, Notginseng, Dan Shen, Ginger, Garcinia, Guggulu, Sage, Barberry, Gokshura, Celery seed, psyllium seed husk, and mixtures thereof.

Examples of fruit extracts that may be included include without limitation, Apple, Apricot, Banana, Blueberry, Cranberry, Cherry, Fig, Grape, Grapefruits, Hawthorn Berry, Huckleberry, Kiwi, Kumquat, Lemon, Lime, Mango, Melon, Nectarine, Noni fruit, Orange, Papaya, Peach, Pear, Persimmon, Pineapple, Plum, Pomegranate, Raspberry, Strawberry, Tangerine, Watermelon.

Examples of vegetable extracts include without limitation Artichoke, Avocado, Asparagus, Beans, Bell Pepper, Broccoli, Brussels Sprout, Cabbage, Cauliflower, Carrot, Celery, Cucumber, Eggplant, green bean, Lettuce, Onion, Parsley, Pea, Potato, Pumpkin, Radish, Radicchio, Rhubarb, Spinach, Tomato, Zucchini, and mixtures thereof.

It is important to remember that a temperature of about 50° C. or less is maintained throughout the entire extraction process of the present invention. It is believed that maintaining the process below this temperature contributes to the optical, taste, organoleptic, and potency characteristics of the present formulations. Additionally, it is believed that the cold temperatures at which the present method is carried out aids in rendering the resulting green tea extract formulations soluble in cold, as well as hot water.

EXAMPLES

The following examples are provided in order to promote a more clear understanding of certain embodiments of the invention, and are in no way meant as a limitation thereon.

Example 1

Green Tea Extract Method

First, by steaming fresh green tea leaves immediately picked from a green tea plant, the enzymes in the tea leaves are inactivated. The steaming temperature is 90°±5° C. for up to 30 seconds. The steamed green tea leaves are immediately cooled with a cooler or ice, and cut and crushed. One kilogram of the crushed green tea leaves are initially mixed with 0.5 kg of iced purified water containing a pre-determined amount of selected antioxidants. The leaves are then pulverized using a high-pressure homogenizer with a continuous, multiple-feed in-line system, and the temperature of the system is controlled below 50° C., preferably 0-25° C., until at least 99% of all green tea leaf cells are ruptured and a homogenous mixture is obtained which includes an aqueous extract component and a leaf residue component. The mixture is then centrifuged by a refrigerated super-centrifuging machine to separate the green tea aqueous extract component from the leaf residue component. If necessary, the multiple pulverizing and centrifuging processes can be made. The obtained green tea extracts can be mixed with selected pharmaceutical/food excipients and other ingredients if necessary and freeze-dried. The green tea leave residues can be kept and further processed as green tea fiber.

Example 2

Green Tea Extract Method

Fresh green tea leaves were picked from tea plant, and reduced in size. Approximately one kilogram of the crushed leaves are initially mixed with 20 kg of iced purified water containing a pre-determined amount of selected antioxidant agents. The pulverization process is conducted by using high efficiency colloid mill having a continuous, multiple-feed in-line system, and the temperature of the system is controlled below 50° C., preferably 0-10° C. until at least 99% of all green tea leaf cells are ruptured and a homogenous mixture with a green tea aqueous extract component and a leaf residue component is obtained. The mixture is then centrifuged by a refrigerated super-centrifuging machine to separate the green tea extracts and leaf residue. The obtained green tea extracts can be mixed with selected pharmaceutical/food excipients and other ingredients if necessary and spray-dried. The green tea leave residues can be kept and further processed as green tea fiber.

Example 3

Polyphenol Content from Green Tea Extracts

Sixteen batches of green tea extracts using the method disclosed in this invention were assayed by a validated HPLC method for the content of total polyphenols. The results are summarized in Table I.

TABLE I

The Contents of Total Polyphenols from Different Batches of Green Tea Extracts

| Batch Number | EGC (%) | C (%) | EC (%) | EGCG (%) | GC (%) | ECG (%) | Total (%) |
| --- | --- | --- | --- | --- | --- | --- | --- |
| TTI GT 053102 | 9.16 | 0.98 | 4.92 | 9.23 | 0.44 | 4.43 | 29.17 |
| TTI GT 053102-P4 | 9.67 | 0.77 | 4.68 | 11.37 | 0.53 | 4.13 | 31.15 |
| TTI GT 053102-T1 | 12.69 | 1.45 | 5.97 | 15.28 | 1.09 | 5.67 | 42.15 |
| TTI GTM 033102-O | 10.40 | 1.33 | 5.38 | 9.21 | 0.66 | 4.17 | 31.15 |
| TTI GTM 033102-L | 10.49 | 1.25 | 6.08 | 10.35 | 0.76 | 4.73 | 33.66 |
| TTI GTM 033102-R | 12.25 | 1.31 | 6.09 | 10.10 | 0.71 | 4.74 | 35.20 |
| TTI GT 080501-P1 | 9.42 | 0.80 | 5.04 | 11.96 | 0.51 | 5.20 | 32.93 |
| TTI GT 112701-001 | 11.01 | 0.88 | 2.37 | 13.57 | 0.35 | 2.76 | 30.94 |
| TTI GT 052001-P1 | 12.60 | 0.20 | 5.22 | 7.80 | 0.10 | 3.40 | 29.32 |
| TTI GT 052001-P5 | 9.34 | 0.30 | 2.73 | 13.39 | 0.79 | 4.05 | 30.60 |
| TTI GT P1-15-So | 13.86 | 0.51 | 4.11 | 12.53 | 0.29 | 5.36 | 36.66 |
| TTI GT P5-15 | 11.14 | 0.29 | 1.74 | 13.81 | 0.84 | 3.92 | 31.74 |
| TTI GT 102601-P4 | 11.61 | 0.40 | 2.37 | 13.85 | 0.37 | 2.82 | 31.42 |
| TTI GT 070701-P1 | 10.26 | 0.79 | 4.98 | 12.45 | 0.48 | 5.20 | 34.16 |
| TTI GT 070701-P2 | 8.44 | 0.35 | 2.10 | 14.50 | 1.32 | 3.99 | 30.70 |
| TTI GT 051501-K | 10.57 | 1.51 | 4.54 | 11.36 | 0.27 | 4.88 | 33.13 |
| Average | 10.81 | 0.82 | 4.27 | 11.92 | 0.59 | 4.34 | 32.75 |
| Std. Dev. | 1.49 | 0.45 | 1.51 | 2.14 | 0.32 | 0.86 | 3.24 |

C = Catechin;
EC = Epicatechin;
GC = Gallocatechins;
EGC = Epigallocatechin;
ECG = Epicatechin gallate;
EGCG = Epigallocatechin gallate.

Example 4

Comparison of Tea Products with Leading Brands

The polyphenol contents from 36 commercially available green tea/tea products were assayed by using a validated HPLC method. All samples were prepared followed the product label instructions: to prepare the tea bag samples, pour 8 oz. of boiling water over one tea bag, steep for 7-10 minutes, then pull the bag up and down for 3-5 times. To prepare tea from powder or concentrates, add the indicated measurement of tea powder into 8 oz. water, and stir until dissolved. To prepare a bottled tea, shake well before the assay. All prepared samples were assayed by HPLC. The results are listed in Table II.

TABLE II

Comparison with Green Tea/Tea Products to Leading Brands

| No. | Company | Product Name | Net Wt. (Per serving) | Polyphenols (mg) | Note |
| --- | --- | --- | --- | --- | --- |
| 1 | Xel (TeaTech) | TeaTech Instant Green Tea Beverage Mix | 2 g* | >300 | Natural Green powder, |

TABLE II-continued

Comparison with Green Tea/Tea Products to Leading Brands

| No. | Company | Product Name | Net Wt. (Per serving) | Polyphenols (mg) | Note |
|---|---|---|---|---|---|
| 2 | A | Instant Tea/Unsweetened | 0.8 g | 10-15 | Brown powder |
| 3 | A | Instant Tea/Decaf | 0.8 g | <1 | Brown powder |
| 4 | A | Iced Tea Mix/Decaf | 1.5 g | <1 | Brown powder |
| 5 | A | Iced Tea Mix/Lemon | 18 g | 2-3 | Brown powder |
| 6 | B | Iced Tea Mix/Unsweetened | 1 g | 40-45 | Brown powder |
| 7 | B | Iced Tea Mix/Decaf | 1 g | 30-35 | Brown powder |
| 8 | B | Iced Tea Mix/Sugar Free | 2 g | <1 | Brown powder |
| 9 | B | Iced Tea Mix/Sugar | 26 g | <1 | Brown powder |
| 10 | A | Iced Tea/Unsweetened | 16 fl oz. | 30-35 | Ready-to-Drink |
| 11 | A | Iced Tea/Sweetened | 16 fl oz. | 20-25 | Ready-to-Drink |
| 12 | A | Iced Tea/Lemon | 16 fl oz. | 15-20 | Ready-to-Drink |
| 13 | A | Iced Tea/Raspberry | 16 fl oz. | 15-20 | Ready-to-Drink |
| 14 | B | Iced Tea/Lemon | 16 fl oz. | <1 | Ready-to-Drink |
| 15 | B | Iced Tea/Peach | 16 fl oz. | <1 | Ready-to-Drink |
| 16 | B | Iced Tea/Diet, Lemon | 16 fl oz. | 3-5 | Ready-to-Drink |
| 17 | B | Concentrated Green Tea/Original | 36 g | 40-45 | Concentrated Liquid |
| 18 | B | Concentrated Green Tea/Lemon | 36 g | <1 | Concentrated Liquid |
| 19 | B | Concentrated Green Tea/Raspberry | 36 g | <1 | Concentrated Liquid |
| 20 | C | Iced Tea/Lemon | 12 fl oz. | <1 | Ready-to-Drink |
| 21 | D | Green Tea/Ginseng | 20 fl oz. | 35-40 | Ready-to-Drink |
| 22 | E | Green Tea/Ginkgo | 20 fl oz. | 40-45 | Ready-to-Drink |
| 23 | E | Iced Tea/Lemon | 16 fl oz. | 5-10 | Ready-to-Drink |
| 24 | E | Iced Tea/Raspberry | 16 fl oz. | 10-15 | Ready-to-Drink |
| 25 | F | Ginseng Green Tea | 20 fl oz. | 50-55 | Ready-to-Drink |
| 26 | G | Ginseng Green Tea | 20 fl oz. | 105-110 | Ready-to-Drink |
| 27 | H | Green Tea/Fruit Juice | 14 fl oz. | 30-40 | Ready-to-Drink |
| 28 | I | Iced Green Tea | 16 fl oz. | <5 | Ready-to-Drink |
| 29 | J | Iced Green Tea | 16 fl oz. | <5 | Ready-to-Drink |
| 30 | K | Green Tea | 2 g/bag | 30-40 | Tea bag |
| 31 | K | Green Tea/Decaf | 2 g/bag | 10-15 | Tea bag |
| 32 | A | Green Tea/Mint | 1.3 g/bag | 20-25 | Tea bag |
| 33 | A | Green Tea/Decaf | 1.4 g/bag | 20-25 | Tea bag |
| 34 | L | Green Tea/Peach | 1.3 g/bag | 25-30 | Tea bag |
| 35 | H | Green Tea/Black Tea | 1.9 g/bag | 15-20 | Tea bag |
| 36 | M | Green Tea | 1.5 g/bag | 15-20 | Tea bag |
| 37 | N | Green Tea | 2 g/bag | 25-30 | Tea bag |

*One serving of TeaTech Instant Green Tea beverage Mix contains about 1 gram of green tea extract obtained by using extraction method from this invention.

It is obvious that the green tea beverage made from green tea extract from this invention has much higher polyphenols than any other commercial green tea or tea beverage products.

Example 5

Stability of Green Tea Products

The stability study was conducted with three lots of the instant green tea products using the green tea extract disclosed in this invention. The product was stored at room temperature for up to one year. At t=0, 6 and 12 months, one canister of instant green tea product was opened. The polyphenols contents were assayed by HPLC method. The results are summarized in Table III a-c.

TABLE III-a

T = 0 time point of 20020801 lot of green tea product

| Lot Number | EGC | C | EC | EGCG | GCG | ECG | Total (mg) |
|---|---|---|---|---|---|---|---|
| TTI-IGT-L- | 91.78 | 17.92 | 56.74 | 92.77 | 6.65 | 40.39 | 306.25 |
| 20020801 | 91.36 | 18.11 | 56.99 | 92.34 | 5.56 | 40.44 | 304.80 |
|  | 92.05 | 17.88 | 55.95 | 91.89 | 6.23 | 41.28 | 305.28 |
| Mean | 91.73 | 17.97 | 56.56 | 92.33 | 6.15 | 40.70 | 305.44 |
| SD | 0.35 | 0.12 | 0.54 | 0.44 | 0.55 | 0.50 | 0.74 |
| TTI-IGT-O- | 91.91 | 16.55 | 52.97 | 90.52 | 6.06 | 44.19 | 302.22 |
| 20020801 | 91.25 | 17.05 | 54.25 | 91.33 | 5.78 | 42.55 | 302.21 |
|  | 90.68 | 16.75 | 53.98 | 92.65 | 6.16 | 40.36 | 300.58 |
| Mean | 91.28 | 16.78 | 53.73 | 91.50 | 6.00 | 42.37 | 301.67 |
| SD | 0.62 | 0.25 | 0.67 | 1.07 | 0.20 | 1.92 | 0.94 |
| TTI-IGT-R- | 94.14 | 13.04 | 59.20 | 95.23 | 6.42 | 39.41 | 307.44 |
| 20020801 | 93.44 | 15.24 | 58.23 | 93.47 | 6.14 | 40.22 | 306.74 |
|  | 92.88 | 14.66 | 57.68 | 91.79 | 5.87 | 41.13 | 304.01 |
| Mean | 93.49 | 14.31 | 58.37 | 93.50 | 6.14 | 40.25 | 306.06 |
| SD | 0.63 | 1.14 | 0.77 | 1.72 | 0.28 | 0.86 | 1.81 |

TABLE III-b

T = 6 month time point of 20020801 lot of green tea product

| Lot Number | EGC | C | EC | EGCG | GCG | ECG | Total (mg) |
|---|---|---|---|---|---|---|---|
| TTI-IGT-L- | 91.65 | 17.88 | 54.88 | 91.79 | 6.55 | 40.44 | 303.19 |
| 20020801 | 92.44 | 17.95 | 56.01 | 92.45 | 5.78 | 41.28 | 305.91 |
|  | 91.98 | 18.24 | 55.77 | 90.92 | 6.33 | 40.68 | 303.92 |
| Mean | 92.02 | 18.02 | 55.55 | 91.72 | 6.22 | 40.80 | 304.34 |
| SD | 0.40 | 0.19 | 0.60 | 0.77 | 0.40 | 0.43 | 1.41 |
| TTI-IGT-O- | 91.55 | 17.11 | 56.15 | 91.64 | 5.98 | 41.19 | 303.62 |
| 20020801 | 92.01 | 16.68 | 54.89 | 92.22 | 6.45 | 43.01 | 305.26 |
|  | 90.49 | 17.48 | 55.66 | 91.06 | 6.22 | 42.44 | 303.35 |

TABLE III-b-continued

T = 6 month time point of 20020801 lot of green tea product

| Lot Number | EGC | C | EC | EGCG | GCG | ECG | Total (mg) |
|---|---|---|---|---|---|---|---|
| Mean | 91.35 | 17.09 | 55.57 | 91.64 | 6.22 | 42.21 | 304.08 |
| SD | 0.78 | 0.40 | 0.64 | 0.58 | 0.24 | 0.93 | 1.03 |
| TTI-IGT-R- | 92.59 | 14.12 | 56.78 | 94.66 | 5.99 | 41.22 | 305.36 |
| 20020801 | 94.24 | 14.25 | 57.07 | 95.11 | 5.44 | 40.36 | 306.47 |
|  | 93.44 | 13.95 | 59.01 | 93.87 | 6.14 | 39.45 | 305.86 |
| Mean | 93.42 | 14.11 | 57.62 | 94.55 | 5.86 | 40.34 | 305.90 |
| SD | 0.83 | 0.15 | 1.21 | 0.63 | 0.37 | 0.89 | 0.56 |

TABLE III-c

T = 12 month time point of 20020801 lot of green tea product

| Lot Number | EGC | C | EC | EGCG | GCG | ECG | Total (mg) |
|---|---|---|---|---|---|---|---|
| TTI-IGT-L- | 90.65 | 17.18 | 53.88 | 90.79 | 6.55 | 40.44 | 299.49 |
| 20020801 | 91.44 | 17.05 | 55.01 | 91.45 | 5.78 | 39.28 | 300.01 |
|  | 90.48 | 17.24 | 54.77 | 90.92 | 6.33 | 39.68 | 299.42 |
| Mean | 90.86 | 17.16 | 54.55 | 91.05 | 6.22 | 39.80 | 299.64 |
| SD | 0.51 | 0.10 | 0.60 | 0.35 | 0.40 | 0.59 | 0.32 |
| TTI-IGT-O- | 90.55 | 17.11 | 54.15 | 90.64 | 5.98 | 40.19 | 298.62 |
| 20020801 | 91.01 | 16.68 | 53.84 | 91.22 | 5.45 | 39.91 | 298.11 |
|  | 91.12 | 16.91 | 53.92 | 90.47 | 5.52 | 40.05 | 297.99 |
| Mean | 90.89 | 16.90 | 53.97 | 90.78 | 5.65 | 40.05 | 298.24 |
| SD | 0.30 | 0.22 | 0.16 | 0.39 | 0.29 | 0.14 | 0.33 |
| TTI-IGT-R- | 91.59 | 14.12 | 54.78 | 91.66 | 5.99 | 39.92 | 298.06 |
| 20020801 | 90.24 | 13.88 | 55.07 | 92.11 | 5.44 | 40.36 | 297.10 |
|  | 91.24 | 13.87 | 54.44 | 92.87 | 5.64 | 39.45 | 297.51 |
| Mean | 91.02 | 13.96 | 54.76 | 92.21 | 5.69 | 39.91 | 297.56 |
| SD | 0.70 | 0.14 | 0.32 | 0.61 | 0.28 | 0.46 | 0.48 |

Each assay was conducted using one serving amount of green tea product (equals to about 1 gram of green tea extract). The results show that our green tea products are very stable up to one year at room temperature. The content of total polyphenols at 12 month time point was 97.6% compared to the value at t=0 time point. The product shelf life has been set up to 3 years.

Example 6

Other Component Assay from Green Tea Extracts

Six batches of green tea extracts made by the extraction method from this invention were assayed for green tea beneficial nutrients and caffeine contents. The results are summarized in Table IV-a and b.

TABLE IV-a

The Contents of Vitamins, Amino Acids and Caffeine from Six Batches of Green Tea Extracts

| Batch Number | Caffeine (%) | Free Amino Acids (%) | L-Theanine (%) | Vitamins (mg, %) | | | |
|---|---|---|---|---|---|---|---|
| | | | | Va | Vb | Vc | Ve |
| TTI GT 053102-P4 | 4.06 | 4.32 | 2.95 | 2.25 | 3.45 | 315 | 82 |
| TTI GTM 033102O | 4.51 | 6.55 | 3.35 | 3.54 | 4.25 | 280 | 124 |
| TTI GT 112701-01 | 5.26 | 5.89 | 4.41 | 1.95 | 2.87 | 294 | 129 |
| TTI GT 102601-P4 | 4.93 | 4.55 | 6.75 | 5.56 | 3.64 | 320 | 96 |
| TTI GT 070701-P1 | 4.18 | 5.95 | 5.95 | 7.88 | 2.79 | 295 | 106 |
| TTI GT 051501-K | 3.42 | 4.33 | 5.25 | 6.90 | 3.89 | 311 | 150 |
| Average | 4.39 | 5.27 | 4.78 | 4.68 | 3.48 | 303 | 114 |
| Std. Dev. | 0.71 | 0.75 | 0.94 | 2.28 | 0.48 | 11 | 21 |

TABLE IV-b

The Contents of Minerals from Six Batches of Green Tea Extracts

| Batch Number | Minerals (mg, %) | | | | |
|---|---|---|---|---|---|
| | Ca | P | Fe | Na | K |
| TTI GT 053102-P4 | 310 | 410 | 14.22 | 6.65 | 1500 |
| TTI GTM 033102O | 680 | 560 | 20.56 | 7.88 | 2400 |
| TTI GT 112701-01 | 250 | 480 | 24.12 | 6.35 | 1900 |
| TTI GT 102601-P4 | 745 | 320 | 31.55 | 7.59 | 2650 |
| TTI GT 070701-P1 | 550 | 750 | 19.88 | 8.12 | 2200 |
| TTI GT 051501-K | 470 | 390 | 25.58 | 6.45 | 2360 |
| Average | 501 | 485 | 22.65 | 7.17 | 2168 |
| Std. Dev. | 177 | 163 | 4.34 | 0.75 | 276 |

Example 7

Green Tea Chlorophyll Content Assay

The contents of green tea chlorophyll from 16 batches of green tea extracts made by the extraction method from this invention were assayed. The results are summarized in Table V. Depending on the harvesting time and extraction ratio, the chlorophyll contents varied from 0.6 to 1.2%.

TABLE V

Chlorophyll Contents from 16 Batches of Green Tea Extracts.

| Batch Number | Chlorophyll (%) |
|---|---|
| TTI GT 053102 | 0.85 |
| TTI GT 053102-P4 | 0.92 |
| TTI GT 053102-T1 | 0.76 |
| TTI GTM 033102-O | 0.88 |
| TTI GTM 033102-L | 0.78 |
| TTI GTM 033102-R | 0.75 |
| TTI GT 080501-P1 | 1.15 |
| TTI GT 112701-001 | 0.94 |
| TTI GT 052001-P1 | 0.86 |
| TTI GT 052001-P5 | 0.88 |
| TTI GT P1-15-So | 0.99 |
| TTI GT P5-15 | 0.81 |
| TTI GT 102601-P4 | 0.64 |
| TTI GT 070701-P1 | 0.86 |
| TTI GT 070701-P2 | 0.89 |
| TTI GT 051501-K | 1.05 |
| Average | 0.87 |
| Std. Dev. | 0.10 |

It is to be understood that the above-described compositions and methods are only illustrative of preferred embodiments of the present invention. Numerous modifications and alternative arrangements may be devised by those skilled in the art without departing from the spirit and scope of the present invention and the appended claims are intended to cover such modifications and arrangements.

Thus, while the present invention has been described above with particularity and detail in connection with what is presently deemed to be the most practical and preferred embodiments of the invention, it will be apparent to those of ordinary skill in the art that numerous modifications, including, but not limited to, variations in materials, temperature, function, order, and manner of operation, assembly and use may be made without departing from the principles and concepts set forth herein.

What is claimed is:

1. A green tea extract, having:
    a) no organic solvent or alcohol residues, and not any chemical residues
    b) a natural unoxidized green color provided by a green tea chlorophyll content of from about 0.1% w/w to about 5.0% w/w;
    c) a total natural polyphenol content of from about 15% w/w to about 95% w/w;
    d) a total natural free amino acid content of from about 0.1% w/w to about 15% w/w;
    e) a total natural EGCG content of from about 1% w/w to about 85% w/w;
    f) a fresh green tea taste; and
    g) a natural green tea fiber resulting in a cloudy or somewhat opaque (not clear) characteristic in an aqueous form,
    wherein the green tea extract is soluble in both hot and cold water.

2. The green tea extract of claim 1, wherein the total polyphenol content is from about 20% w/w to about 90% w/w.

3. The green tea extract of claim 2, wherein the total polyphenol content is from about 25% w/w to about 85% w/w.

4. The green tea extract of claim 1, wherein the EGCG content is from about 3% w/w to about 80%.

5. The green tea extract of claim 4, wherein the EGCG content is from about 5% w/w to about 75% w/w.

6. The green tea extract of claim 1, wherein the green tea chlorophyll content is from about 0.5% w/w to about 4% w/w.

7. The green tea extract of claim 6, wherein the green tea chlorophyll content is from about 0.5% w/w to about 3% w/w.

8. The green tea extract of claim 1, also having a theanine content of from about 0.1% w/w to about 10% w/w.

9. The green tea extract of claim 8, wherein the theanine content is from about 0.5% to about 8% w/w.

10. The green tea extract of claim 9, wherein the theanine content is from about 1% to about 6% w/w.

11. The green tea extract of claim 1, wherein the green tea extract, when combined with an effective amount of water, makes a beverage, each serving of which includes:
    a) a total polyphenol content of at least about 100 mg; and
    b) an EGCG content of at least about 50 mg.

12. A green tea extract as set forth in claim 1 prepared according to a method comprising the following steps performed at a temperature condition of about 50° C. or less:
    a) combining a quantity of fresh-picked green tea leaves or leaf fragments from a camellia sinensis plant with an amount of cold water having a temperature of about 25° C. or less that is sufficient to provide a mixture of leaves and water having a ratio of from about 1:0.01 to about 1:40 by weight;
    b) pulverizing the leaves or leaf fragments in the mixture and maintaining the mixture for an amount of time sufficient to release intracellular material from the leaf cells into the water to create an aqueous extract component, and a leaf residue component;
    c) removing the leaf residue component from the aqueous extract component; and
    d) drying the aqueous extract component to a solid or semi-solid state wherein the green tea extract has a green tea chlorophyll content of from about 0.1% w/w to about 5.0% w/w which provides the extract with a natural green color, and a polyphenol content of from about 15% w/w to about 95% w/w, of which greater than 80% is retained in the extract after storage for 12 months.

13. A green tea beverage, comprising:
   a) A green tea extract, having:
      i) a natural unoxidized green color provided by a green tea chlorophyll content of from about 0.1% w/w to about 5.0% w/w;
      ii) a total natural polyphenol content of from about 15% w/w to about 95% w/w;
      iii) a total natural free amino acid content of from about 0.1% w/w to about 15% w/w;
      iv) an total natural EGCG content of from about 1% w/w to about 85% w/w;
      v) a fresh green tea taste; and
      vi) a natural green tea fiber resulting in a cloudy or somewhat opaque (not clear) characteristic in an aqueous form,
   b) an effective amount of water,
wherein the green tea extract is present in an amount so that one serving of the beverage provides at least about 100 mg of polyphenols.

14. The green tea beverage of claim 13, wherein the green tea extract is present in an amount so that one serving of the beverage provides at least about 300 mg of polyphenols.

15. The green tea beverage of claim 14, wherein the green tea extract is present in an amount so that one serving of the beverage provides at least about 600 mg of polyphenols.

16. The green tea beverage of claim 13, wherein the green tea extract is present in an amount so that one serving of the beverage provides at least about 50 mg of EGCG.

17. The green tea beverage of claim 16, wherein the green tea extract is present in an amount so that one serving of the beverage provides at least about 150 mg of EGCG.

18. The green tea beverage of claim 17, wherein the green tea extract is present in an amount so that one serving of the beverage provides at least about 300 mg of EGCG.

19. The green tea beverage of claim 13, wherein the green tea extract has a theanine content from about 0.1% w/w to about 10% w/w.

20. The green tea beverage of claim 19, wherein the green tea extract has a theanine content from about 0.5% w/w to about 8% w/w.

21. The green tea beverage of claim 20, wherein the green tea extract has a theanine content from about 1% w/w to about 6% w/w.

22. The green tea beverage of claim 13, wherein the beverage has a natural green color provided by the chlorophyll in the green tea extract.

23. The green tea beverage of claim 13, wherein the water is hot water.

24. The green tea beverage of claim 13, wherein the water is cold water.

25. The green tea beverage of claim 13, further comprising a fruit extract.

26. The green tea beverage of claim 25, wherein the fruit extract is selected from the group consisting of: acai berry, apple, apricot, banana, blueberry, cranberry, cherry, fig, grape, grapefruits, hawthorn berry, huckleberry, kiwi, kumquat, lemon, lime, luohan fruit, lychee (litchi), mango, melon, nectarine, noni fruit, orange, papaya, peach, pear, persimmon, pineapple, plum, pomegranate, raspberry, strawberry, tangerine, watermelon, and mixtures thereof.

27. The green tea beverage of claim 13, further comprising a vegetable extract.

28. The green tea beverage of claim 27, wherein the vegetable extract is selected from the group consisting of: artichoke, avocado, asparagus, beans, bell pepper, broccoli, brussels sprout, cabbage, cauliflower, carrot, celery, cucumber, eggplant, green bean, lettuce, onion, parsley, pea, potato, pumpkin; radish, radicchio, rhubarb, spinach, tomato, zucchini, and mixtures thereof.

29. The green tea beverage of claim 13, further comprising at least one water-soluble vitamin selected from the group consisting of vitamin $B_1$, vitamin $B_2$, vitamin $B_3$, vitamin $B_5$, vitamin $B_6$, vitamin $B_{12}$, vitamin $B_{13}$, vitamin $B_{15}$, vitamin $B_{17}$, biotin, choline, folic acid, inositol, para-aminobenzoic acid (PABA), vitamin C, vitamin P, and combinations thereof.

30. The green tea beverage of claim 13, further comprising at least one oil-soluble vitamin selected from the group consisting of: vitamin A, vitamin D, vitamin E, vitamin K, and combinations thereof.

31. The green tea beverage of claim 13, further comprising at least one amino acid ingredient selected from the group consisting of alanine, arginine, carnitine, gamma-aminobutyric acid, glutamine, glycine, histidine, lysine, methionine, N-acetyl cysteine, ornithine, phenylalanine, taurine, L-theanine, tyrosine, valine, and mixtures thereof.

32. The green tea beverage of claim 13, further comprising an herbal extract.

33. The green tea beverage of claim 32, wherein the herbal extract is selected from the group consisting of ginseng, ginkgo biloba, dong qui, hawthorn berry, goji berry, hoodia, St. John's wort, saw palmetto, kava kava, rose hips, echinacea, licorice root, grape seed, chamomile, sea buckthorn, aloe vera, cinnamon bark, cordyceps, ho shou wu, dandelion, gynostemma, mushroom, notoginseng, dan shen, ginger, garcinia, guggulu, sage, barberry, gokshura, celery seed, psyllium seed husk, and mixtures thereof.

34. A composition comprising the green tea extract of claim 1 and a carrier.

35. The composition of claim 34, wherein the carrier is water, and the composition is a beverage.

36. The composition of claim 34, wherein the carrier is selected from the group consisting of carboxymethylcellulose sodium, cellulose, dextrin, dextrose, ethylcellulose, fructose, gelatin, guar gum, hydroxyethyl cellulose, hydroxypropyl cellulose, hydroxypropyl methylcellulose, glucose, maltodextrin, mannitol, methylcellulose, microcrystalline cellulose, polymethacrylates, povidone, sorbitol, starches, sucrose, sugar, sucralose, stevia, flavor agents, and combinations thereof.

37. The composition of claim 34, wherein the composition is formulated as a solid oral dosage form.

38. The composition of claim 37, wherein the composition is formulated as a chewing gum.

39. The composition of claim 37, wherein the composition is formulated as a tablet.

40. The composition of claim 37, wherein the composition is formulated as a powder.

41. The composition of claim 37, wherein the composition is formulated as a lozenge.

* * * * *